Patented Aug. 4, 1953

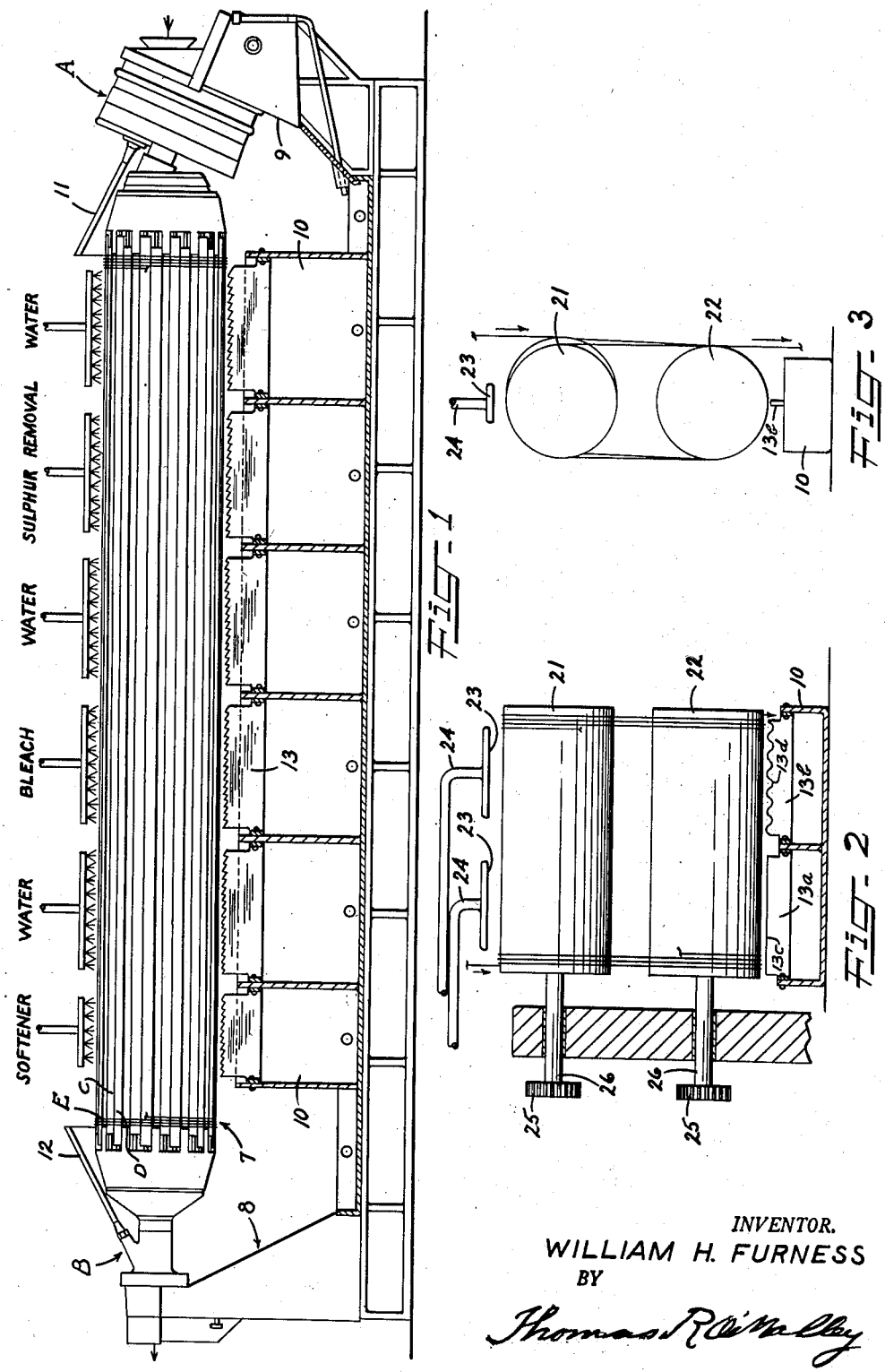

2,647,389

UNITED STATES PATENT OFFICE 2,647,389

YARN ADVANCING REEL HAVING LIQUID APPLYING AND LIQUID STRIPPING MEANS

William H. Furness, Haddonfield, N. J., assignor to American Viscose Corporation, Philadelphia, Pa., a corporation of Delaware Application February 6, 1948, Serial No. 6,694

6 Claims. (Cl. 68—208)

This invention relates to the treatment of yarns, tows, or other strands of natural or artificially produced fibers or filaments, with liquids. This application is a continuation-in-part of my copending application Serial No. 578,599, filed February 19, 1945, now Patent 2,456,120.

In accordance with this invention, one or more treating liquids are applied to a strand of the filamentary material to be treated as it passes through a path comprising a plurality of laterally spaced convolutions, such as those of a helix, and after the liquid has exerted its effect upon the strand, it is largely removed from the zone of treatment by stripper means having an edge closely adjacent but out of contact with the lower portion of the convolutions. By providing a separate stripper and collecting trough with each treating zone, it is possible to effectively maintain separation between the liquids discharged from the several treatment zones.

In the drawing,

Figure 1 is a diagrammatic side elevation, partially in section of one embodiment of the invention, Figure 2 is a side elevation, partially in section of a modification, and Figure 3 is an end elevation of the embodiment of Figure 2.

As shown in Figure 1, a rotor in the form of a thread-storage, thread-advancing reel is indicated as a whole by the reference numeral 7, and it is supported rotatably in a horizontal position by the supporting structure at the left hand end, generally indicated by the reference numeral 8, and by the supporting structure at the right hand end, generally indicated by the reference numeral 9. Any form of reel may be employed, such as that of Patent 2,456,120, December 14, 1948.

Immediately above the reel, treatment liquids are applied at a plurality of longitudinally spaced points. Immediately below are the collecting troughs, generally indicated by the reference numeral 10, which serve to separately collect the several treatment liquids for recovery operations.

The manner in which the liquid is applied to the reel to prevent commingling and to allow for separate collection will be later described.

Briefly stated, the operations, when producing viscose yarn of customary deniers, are as follows, reference being had to Figure 1:

The freshly spun rayon is led through the whirler or whorl tube 11 of a whirler device indicated as a whole by the reference letter A as in the above-mentioned application. The whirler device is rotated and lays the freshly spun yarn around the bars or slats C and D of the reel. The bars of the reel operate to advance the turns of yarns laid on by the whirler tube toward the left, in consequence of which the yarn is laid up on the reel in the form of a helix, which advances along the reel to the left hand end thereof, at which point the free end of the yarn is led through a corresponding whirler tube 12 of the whirler device indicated as a whole by the reference letter B. The whirler tube 12 rotates in the same direction as does the whirler tube 11 and at the same speed, and removes the yarn, turn for turn, as laid on by the whirler tube 11. The helix of yarn on the reel is successively subjected to the various liquid treatments diagrammatically indicated in Figure 1. The pitch of the helix is determined by the longitudinal reciprocating stroke of the bars of the reel and the relative speed of the whirler.

To secure a uniform and effective application of the various treatment liquids to all of the yarn on the reel, it is desirable to rotate the reel slowly, though rapid rotation may be used, whenever the character of the threads and the treatment permit somewhat more vigorous treatment. This rotation may be in the same direction of rotation as that of the whirler tube 11, or the reel may be rotated in a reverse direction. When the reel is rotated in the same direction as that of the whirler tube 11, the reel is rotated relatively very slowly in order that the yarn may be rapidly laid on the reel. If the reel and the whirler tube rotated at the same speed, in the same direction, no yarn would be laid on the reel. Furthermore, it is desirable to rotate the reel slowly to effectively separately collect the various treatment liquids whenever such separation is important. For example, if the reel was rotated at very high speed, centrifugal force would not only spread the liquids longitudinally but also throw off the liquids, and it is impossible to avoid commingling and to separately collect the same. The reel is preferably rotated opposite to the whirler tube and so slowly as to present no objectionable resistance to the natural dripping off of the liquids due to the action of gravity. To illustrate, if the reel be exactly horizontal and were not turned at all, each liquid applied at the top of the reel would drop off the bottom of the reel, directly below the region of application. The reel should preferably be rotated at a speed such as not objectionably to interfere with this operation. This slow rotation of the horizontally disposed reel, however, will ensure a uniform and effective application of the treatment liquids to the yarn. The liquids are applied to one side of the longitudinal axis, preferably on the upwardly moving side of the reel, in consequence of which there will be a layer of liquid built up on the upwardly moving side of the reel, from the bottom of the reel partway up. Notwithstanding, the liquid will drip off the bottom. Toothed scraper plates 13 are located in the troughs, with their upper edges spaced away from the turns of yarn so as not to contact therewith but close enough to contact with drops of liquid forming on the bottom of the reel, say 1/16" from the turns. This will remove the drops before they have opportunity to run together to form larger bodies, which might run to an adjacent area or section.

By reason of the foregoing, and of the fact that there is a substantial gap between the regions of application of the various liquids, as will be seen on inspection of Figure 1, the individual treatment liquids will not undesirably commingle while on the reel, but will drop off separately for a separate collection in the respective troughs located directly below the means for applying the respective liquids, for separate recovery.

In the reel shown, the whirler 11 is rotated at about 150 R. P. M., winding approximately 100 meters per minute, and, by means of reduction gearing, the reel rotates at 3 R. P. M. in the opposite direction. This I have found to give satisfactory results.

Figures 2 and 3 show my invention as applied to a thread-storage, thread-advancing device comprising two rotors or drums 21 and 22 rotatably mounted on horizontal axes, the axis of the upper drum 21 being canted or inclined as better shown in Figure 3 out of parallelism with that of the lower drum 22. Means for rotating the rotors may comprise the gears 25 on the shafts 26 of the rotors, or either of the rotors may be driven from the other by the convolutions of the yarn in which case one of the driving gears is not necessary. Two liquid treatments are shown for illustrative purposes, though any number, such as the six in Figure 1, may be employed. The liquids are supplied to axially spaced zones of the winding by the spray heads 23 supplied by conduits 24. The strippers 13a and 13b in this embodiment have a smooth edge as shown at 13c and a wavy edge as shown at 13d respectively, instead of the serrated edge shown in Figure 1. However, an indented edge, such as the serrated or wavy type is preferred, at least adjacent the ends of the treating zones, since they effect the maximum removal of the liquid, the smooth or straight edge generally removing considerably less and spreading the remainder as a thick layer or film along the reel.

It is to be understood that changes and variations may be made without departing from the spirit and scope of the present invention as defined in the appended claims.

I claim:
1. The combination with a device comprising at least one rotor for advancing yarn and the like through a path comprising a plurality of laterally spaced convolutions, means for rotating the rotor, means for applying liquid to the convolutions in a treatment zone of the path, means below the rotor for collecting the liquid, and stripper means below the rotor and between the convolutions and the collecting means, said stripper means comprising a generally vertically disposed plate having an upper edge extending generally parallel to the axis of the rotor and closely adjacent to but out of contact with the turns of the yarn upon the rotor, whereby liquid gathering at the bottom of the convolutions is stripped therefrom and discharged into the collecting means.

2. The combination of claim 1 in which the edge of the stripper means is indented at least near the ends of the liquid treating zone.

3. The combination with a device comprising a rotor mounted on a horizontal axis for advancing yarn and the like through a path comprising a plurality of laterally spaced convolutions, means for rotating the rotor, means for applying liquids to the convolutions in a plurality of axially spaced treatment zones of the path, a plurality of correspondingly located collecting means below the rotor, and a plurality of stripper means located below the rotor and between the convolutions of yarn and the collecting means, each of said stripper means comprising a generally vertically disposed plate having an upper edge extending generally parallel to the axis of the rotor and closely adjacent to but out of contact with the convolutions of yarn whereby liquid gathering at the bottom of the convolutions is stripped therefrom and discharged into the respective collecting means.

4. The combination of claim 3 in which the edge of the stripper means is indented at least near the ends of the liquid treating zones.

5. The combination of claim 4 in which the edge of the stripper means is serrated.

6. The combination of claim 4 in which the edge of the stripper means is wavy.

WILLIAM H. FURNESS.

References Cited in the file of this patent

UNITED STATES PATENTS

| Number | Name | Date |
|---|---|---|
| 446,937 | Steelbrooke | Feb. 24, 1891 |
| 535,012 | Kohlrausch | Mar. 5, 1895 |
| 1,983,221 | Furness | Dec. 4, 1934 |
| 2,002,994 | Hartmann | May 29, 1935 |
| 2,129,274 | Hartmann | Sept. 6, 1938 |
| 2,254,251 | Uytenbogaart | Sept. 2, 1941 |
| 2,257,373 | Fanselow | Sept. 30, 1941 |
| 2,279,553 | Bradt | Apr. 14, 1942 |
| 2,348,415 | Polak | May 9, 1944 |
| 2,368,386 | Tarbox | Jan. 30, 1945 |
| 2,416,535 | Naumann | Feb. 25, 1947 |
| 2,481,916 | Ewing | Sept. 13, 1949 |